(12) United States Patent
Min et al.

(10) Patent No.: US 6,462,746 B1
(45) Date of Patent: Oct. 8, 2002

(54) ON SCREEN DISPLAY MEMORY STRUCTURE IN A DIGITAL VIDEO DISPLAY UNIT AND METHOD THEREFOR

(75) Inventors: Seung-Jai Min; Kyung-Yun Lee, both of Seoul; Seong-Ok Bae, Kyonggi-do, all of (KR)

(73) Assignee: LE Electronics Inc., Seoul (KR)

( * ) Notice: Subject to any disclaimer, the term of this patent is extended or adjusted under 35 U.S.C. 154(b) by 0 days.

(21) Appl. No.: 09/296,528

(22) Filed: Apr. 22, 1999

(30) Foreign Application Priority Data

| Apr. 23, 1998 | (KR) | ............................................. 98/14467 |
| Apr. 23, 1998 | (KR) | ............................................. 98/14468 |
| Apr. 23, 1998 | (KR) | ............................................. 98/14469 |
| May 11, 1998 | (KR) | ............................................. 98/16720 |
| May 11, 1998 | (KR) | ............................................. 98/16726 |

(51) Int. Cl.⁷ .............................. G06T 1/60; H04N 5/50
(52) U.S. Cl. ...................... 345/545; 345/632; 345/764; 348/569
(58) Field of Search ................................. 345/629, 632, 345/634–639, 716, 764, 765, 768, 856, 861, 501, 503, 545; 348/569

(56) References Cited

U.S. PATENT DOCUMENTS

| 5,969,770 A | * | 10/1999 | Horton ......................... 348/569 |
| 6,166,728 A | * | 12/2000 | Haman et al. .................. 345/327 |
| 6,181,353 B1 | * | 1/2001 | Kurisu .......................... 345/511 |
| 6,195,079 B1 | * | 2/2001 | Reddy .......................... 345/121 |
| 6,198,468 B1 | * | 3/2001 | Cho .............................. 345/141 |
| 6,215,467 B1 | * | 4/2001 | Suga et al. .................... 345/132 |
| 6,263,396 B1 | * | 7/2001 | Cottle et al. .................. 710/263 |

FOREIGN PATENT DOCUMENTS

| WO | WO9705743 A1 | 2/1997 | |
| WO | 98/17066 | * 4/1998 | ............ H04N/9/64 |

* cited by examiner

*Primary Examiner*—Ulka J. Chauhan
(74) *Attorney, Agent, or Firm*—Birch, Stewart, Kolasch & Birch, LLP

(57) ABSTRACT

A memory structure and method for implementing an on screen display (OSD) is disclosed. The present invention separates a command area, which stores small but frequently updated data causing fatal errors due to erroneous read, from a bitmap area, which stores relatively larger data, less frequently updated than the command area and which is not sensitive to errors. Thus, OSD memory structure and method allows an external host processor to effectively control the OSD process. Also, the command area further comprises a global command and a plurality of local commands, wherein the global command contains common control information to the local commands and control information other than OSD information, thereby allowing the external host processor to effectively control the OSD even when implementing multistandard OSD where a plurality of bitmap and commands for these bitmap are constructed in an external memory.

23 Claims, 13 Drawing Sheets

FIG. 8

`OSD Info`

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved | | | BG En | Cur En | Hi En | OSD 0 | OSD 1 | OSD 2 | OSD 3 | OSD 4 | OSD 5 | OSD 6 | OSD 7 | OSD 8 | OSD 9 | OSD 10 | OSD 11 | OSD 12 | OSD 13 | OSD 14 | OSD 15 | Reserved | | # of OSD | | | | Reserved | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| OSD 0 priority | | | | OSD 1 priority | | | | OSD 2 priority | | | | OSD 3 priority | | | | OSD 4 priority | | | | OSD 5 priority | | | | OSD 6 priority | | | | OSD 7 priority | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| OSD 8 priority | | | | OSD 9 priority | | | | OSD 10 priority | | | | OSD 11 priority | | | | OSD 12 priority | | | | OSD 13 priority | | | | OSD 14 priority | | | | OSD 15 priority | | | |

`BackGR Info`

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Blend Ratio | | | | | | | | Reserved | | | | Stop X position[9:0] | | | | | | | | Reserved | | | | Stop Y position[8:0] | | | | | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 8 Bit CLUT Addr | | | | | | | | Reserved | | | | Stop X position[9:0] | | | | | | | | Reserved | | | | Stop Y position[8:0] | | | | | | | |

`Cursor Info`

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved | | | | | | | | | | | | Stop X position[9:0] | | | | | | | | Reserved | | | | Stop Y position[8:0] | | | | | | | |

`Hi-light Info`

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Hi OSD0 | Hi OSD1 | Hi OSD2 | Hi OSD3 | Hi OSD4 | Hi OSD5 | Hi OSD6 | Hi OSD7 | Reserved | | | | Stop X position[9:0] | | | | | | | | Reserved | | | | Stop Y position[8:0] | | | | | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Hi OSD8 | Hi OSD9 | Hi OSD10 | Hi OSD11 | Hi OSD12 | Hi OSD13 | Hi OSD14 | Hi OSD15 | Reserved | | | | Stop X position[9:0] | | | | | | | | Reserved | | | | Stop Y position[8:0] | | | | | | | |

| Addr | CLUT | | |
|---|---|---|---|
| 0 | Y0 | $C_{B0}$ | $C_{R0}$ |
| 1 | Y1 | $C_{B1}$ | $C_{R1}$ |
| 2 | Y2 | $C_{B2}$ | $C_{B2}$ |
| ⋮ | ⋮ | ⋮ | ⋮ |
| 255 | | | |

Row 0: 300
Rows 1–255: 301

ON SCREEN DISPLAY MEMORY STRUCTURE IN A DIGITAL VIDEO DISPLAY UNIT AND METHOD THEREFOR

BACKGROUND OF THE INVENTION

1. Field of the Invention

The present invention relates to a digital video display unit such as a digital television (DTV) and a digital VCR (DVCR) and more particularly to an on screen display (OSD) memory structure in the digital video display unit to produce effects such as superimposition of characters on a picture screen.

2. Description of Related Art

An OSD function is generally used for superimposing images such as graphics and characters on a displayed image of a TV screen. The OSD allows an image selected by a system or a user to be displayed on an original image being displayed using the OSD information stored in a memory unit.

FIG. 1 is a block diagram showing a conventional OSD operation. As shown, when an OSD command, CMD, is transmitted from a host processor 1 to a video processor IC 2, a video signal decoder 2a in the video processor IC 2 decodes the video signals and forwards the decoded signals to an OSD controller 2b. The OSD controller 2b also receives OSD information from a memory 3 and generates OSD output data. Thereafter, the OSD controller 2b displays the images on a display device 4 such as a TV or PC monitor using the video output signals from the video signal decoder 2a and the generated OSD output signals.

At early development stages of the OSD operation, only a single OSD region was displayed on a screen. However, with the increase of the demand for more OSD functions, the OSD can now support multiple OSD regions to more effectively use an external memory. As shown in FIG. 1, the OSD information is stored in an area of the memory 4, separate from the video signal. For a single OSD region, the external memory consists one area of both the OSD bitmap information and the command information necessary for display of the bitmap memory. In contrast, for multiple OSD regions, the external memory should include a plurality of bitmap and command areas corresponding to the plurality of bitmap for an implementation of a multistandard OSD.

FIG. 2a shows multiple OSD regions displayed on the display device 4 and FIG. 2b shows a memory structure corresponding to the OSD regions shown in FIG. 2a. Referring to FIG. 2b, the OSD region information stored in the command area contains the data designating points of the next region. When the command and bitmap information are stored together, problems may occur while an external host processor updates the OSD information. Particularly, the position onto which a command is written in the OSD region would be variable since a size of a bitmap is variable. Thus, the position of each command must be stored even when the external host processor is updating only the bitmap.

Moreover, when the command and bitmap information are mixed, the host processor for updating the OSD information may not be able to synchronize with the OSD controller for reading the OSD information. In such case, the variable size bitmap tends to intrude into the command area of another OSD, resulting in critical errors in the OSD operation. If the information in the command area is damaged, the host processor writes data onto the memory while outputting the bitmap, thereby affecting the overwriting and resulting in an OSD error.

In the conventional memory, the command area and the bitmap area are not separated in the OSD memory. As a result, the position of the command area is variable and under such condition, synchronization may fail when the host processor updates the OSD information while the OSD controller is reading and processing the OSD information. Thus, an updated new command may be used while the previous data prior to the updated data is used for the bitmap. Furthermore, as discussed above, since the size of the bitmap is variable, the bitmap can be overwritten onto the command area of another OSD when the bitmap is updated.

Due to the large volume of bitmap data, a degree of overwriting the bitmap data may not significantly influence the overall OSD operation. However, for the command data which contains the OSD control information such as the OSD display position, the size and the point of the next bitmap, if the external host processor writes while the OSD controller is reading, a critical error to the overall OSD operation would likely occur.

Highlighting is one function of the OSD operation which simply distinguishes the OSD information from other information by changing a color without changing the content of the OSD information. Generally, such highlighting function has been accomplished using a window based method. FIG. 3 shows a window based highlighting method designating a start point P1 and a stop point P2 to establish the position information of a displayed video, thus setting a window during the operation of displaying the OSD on a screen. The data related to the set window is designated as the command and utilizing such data, the contents of the window are highlighted.

In the window based highlighting method, the position of the set window (start point and stop point) must be noted. Particularly, assuming that $0 \leq X \leq 720$ and $0 \leq Y \leq 480$, a minimum of 38 bits comprising 10 bits for X_start, 10 bits for X_stop, 9 bits for Y_start and 9 bits for Y_stop must be stored as part of the information. Accordingly, as the number of different windows to be highlighted increases, the load on the hardware also increases. Furthermore, when one OSD region is displayed on a screen, only the position of the OSD region to be displayed is simply selected and distinguished from the other parts. However, when multiple OSD regions must be displayed, the load on the hardware further increases.

A method to access the color of the highlighted window for the highlighting function will be described with reference to FIG. 4. Assuming that the index information of a bitmap consists of 8 bits, the color signal data Yn, Cbn and Crn, corresponding to the OSD image, is stored in a color look-up table (CLUT) 12 within the OSD memory and is accessed using the index as an address. The accessed color signal data, Yn, Cbn, and Crn, is visually presented on a screen 14 of the display device.

However, during the actual color access for the portion to be highlighted, the usual OSD CLUT 12 is not used, but a specially generated highlight color look-up table (H-CLUT) 13 is used. After the portion to be highlighted is completely selected and assigned a command, the corresponding color signal data, Yn', Cbn', and Cm' in the H-CLUT 13 is accessed using an index as an address and displayed on the screen 14, where the index embedded in 8-bit data 11 corresponds to a relevant position in the bitmap area. Consequently, the corresponding OSD region, H1, is highlighted. According to this highlight color access method, an additional highlight color look-up table need to be constructed in the hardware, resulting in a heavier load on the hardware.

Generally, the CLUT is referred to for color processing of OSD information when applying the OSD process to an MPEG video in the digital TV or PC. The OSD bitmap stored in the external memory may comprise 2-bit, 4-bit, or 16-bit pixels. When using 8 bits for a pixel, the color look-up table supports 256 colors. The 8-bit data in the OSD memory (bitmap) is used as an index for addressing the color look-up table to read the appropriate color data (address: Addr) from the color look-up table.

Moreover, during the access of the color data in the color look-up table and the OSD processing, a blending process for blending the original video data and OSD data at a proper ratio is performed to implement the various special effects such as a semi-transparent effect on a background of the OSD or the OSD information. To perform this blending process, the blending data indicating at what ratio the original video data and the OSD data are blended is required. For example, if blending effects of 16 stages are wanted, at least 4-bit blending data is needed.

One way to accomplish the OSD blending process is adding the blending data to every color information, Y, Cb, and Cr, in the CLUT. In such case, however, a problem in an increase of the memory size occurs. As shown in FIG. 5, an OSD blending process adds a 1-bit blending flag data for deciding whether or not to perform the blending to a color data designated by each address in the color look-up table. If the added blending flag data 20, for example, is set to "1", the flag indicates an instruction to carry out the blending, thereby an OSD header assigns a blending ratio with 4-bit data. If the blending flag data 20 is set to "0", an OSD output signal is made to be absolutely transparent or completely opaque, rather than being subjected to the blending.

When the 1-bit flag data is added, a 16-bit scheme including 8-bit luminance signal Y, and two 4-bit chrominance signals Cb and Cr, is changed into a 17-bit scheme. Namely, to make the CLUT having 16 bits in width which allows an easy construction in hardware, the 8-bit luminance signal is reduced by 1 bit, so that a color look-up table of 16-bit scheme comprising a 7-bit luminance signal, two 4-bit chrominance signals, and the added 1-bit blending flag data 21 is reconstructed to be used. However, adding the 1-bit blending flag data 21 reduces the data volume of the luminance signal in order to reconstruct the color look-up table. The reduction of the data volume is inconvenient and the volume of data actually influencing the display is also reduced.

Furthermore, during the access to the color data in the CLUT and the OSD processing, there may be a case where different degrees of resolution must be supported on the same picture screen. For example, the same color look-up table can be accessed with both 4-bit index and 8-bit index. In such case, the 4-bit index is extended to the 8-bit index through a bit extension. When accessing the CLUT with the 8-bit index, all resources of 256 colors can be accessed. On the other hand, when accessing the same CLUT with the 4-bit index for display on the same screen, only 16 colors can be accessed. Therefore, when using a fixed bit data, a 4-bit indexed bitmap information is supported with only 16 colors although 256 color resources are available. Although, the above discussion is limited to the 8-bit and 4-bit indexes, such problem arises when different resolution, for example, n-bit (n-bit color resources) and m-bit (m<n), is supported on the same picture screen.

SUMMARY OF THE INVENTION

Accordingly, an object of the present invention is to solve at least the problems and disadvantages of the related art.

An object of the present invention is to provide an OSD memory structure and method in a digital video display unit, wherein the OSD command information is optimized to minimize errors caused by overwrite of data while using the memory. The OSD command information is optimized by separating a command area from the bitmap area and fixing positions of individual commands in the command area.

Another object of the present invention is to provide an OSD memory structure and method in a digital video display unit, wherein a command area is divided into a global command and local commands to minimize a size of the memory occupied by the command and to allow an external host processor to control the command more effectively.

Still another object of the present invention is to provide an OSD memory structure and method in a digital video display unit, wherein a flag for deciding a highlight is established on the memory header information defining an OSD region and a highlight process is performed with respect to the OSD region according to the flag setting, thereby allowing the highlight process on a plurality of OSD regions without a heavier load on the hardware when implementing the highlight on multistandard OSD.

A further object of the present invention is to provide an OSD memory structure and method in a digital video display unit, wherein a window based highlight processing method is used for partially highlighting a part of an OSD region and for highlighting a part of a gap between OSD regions, thereby allowing various OSD highlight processes on multistandard OSD.

A still further object of the present invention is to provide an OSD memory structure in a digital video display unit and a method therefor, wherein an address to a color look-up table is changed by inverting a part of data to be highlighted, allowing the data to be obtained from a bitmap area, thereby simply carrying out a highlight process without constructing an additional highlight color look-up table.

A still further object of the present invention is to provide an OSD memory structure and method in a digital video display unit, wherein bits are set to most significant bits and the most significant bits are inverted, thereby effectively using a color look-up table.

A still further object of the present invention is to provide an OSD memory structure and method in a digital video display unit, wherein a color look-up table is classified into a group of areas to be blended and a group of areas not to be blended, and an OSD header assigns a blending ratio to each area, thereby performing a digital OSD blending process.

A still further object of the present invention is to provide an OSD memory structure and method in a digital video display unit, wherein all color resources can be accessed when different degrees of resolution are supported on the same picture screen.

A still further object of the present invention is to provide an OSD memory structure and method in a digital video display unit, wherein the lack in color resource access data of lower resolution is fulfilled by an OSD header, thereby allowing access to all color resources of higher resolution.

A still further object of the present invention is to provide an OSD memory structure and method in a digital video display unit, wherein index information of 4 most significant bits is supplied from an OSD local header when accessing a color look-up table with four bits under the condition that the color resources in the color look-up table can be accessed with an index of 8 bits, thereby allowing access to all 256 color resources based upon the 8-bit index.

A still further object of the present invention is to provide an OSD memory structure and method in a digital video display unit, wherein individual OSD local headers can construct different index information, thereby allowing different color ranges to be used for individual OSD regions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an OSD memory structure in a digital video display unit comprises a command area storing control information such as a position of an OSD image, a size of the OSD image, a process mode of OSD data, and an OSD function; and a bitmap area storing bitmap data for visually presenting the OSD information, wherein the command area includes information for designating positions of OSD regions stored in the bitmap area.

The command area may further comprises a global header for controlling OSD information displayed on the same picture screen and a local header for storing characteristic information of the OSD information.

An OSD memory control method in the digital video display unit according to the present invention is characterized by establishing a highlight enable flag to decide highlighting of an OSD region on the header information of each OSD region in an OSD memory; setting a flag value according to a request of the highlight; and highlighting the OSD region displayed on a screen according to the set value of the flag.

Highlighting a part of the OSD region and a part of a gap between OSD regions is processed according to a window based highlight processing using the position information contained at the header information in the OSD memory. The flag for deciding whether or not to carry out the highlight is established on the header information of the OSD regions in the memory containing position information of the OSD regions displayed, thereby simply processing the highlight function without an extra load on the hardware. For a part within the OSD range and a part of a gap between OSD ranges, a window based highlight process is employed, instead of a region based highlight process, thereby allowing partial highlight on the part within the OSD region and highlight on the part between OSD regions.

In another embodiment, an OSD memory control method in a digital video display unit comprises determining whether or not to highlight a part of an OSD representation; if the part is determined not to be highlighted, accessing color signal data of a color look-up table using data information obtained from a corresponding position in a bitmap area without change; and if the part is determined to be highlighted, inverting only a selected bit of the data in the bitmap area to be highlighted and accessing the color signal data of the color look-up table using the data having the inverted bit. The selected bit is assigned to the most significant bit and inversion is carried out with respect to the most significant bit.

In another embodiment, an OSD memory control method in a digital video display unit is characterized by blending original image data and OSD data for carrying out a digital OSD function; dividing a color look-up table to be accessed into a plurality of independent areas for the blending process; and, at an OSD header, assigning a blending color value to particular color values in the divided areas for the blending process.

An OSD memory control method according to the present invention is also characterized by having an OSD local header corresponding to each OSD region assign the address to the color look-up table to access the blending color value, thereby allowing OSD regions to have different blending values when a plurality of OSD regions are simultaneously displayed on the same picture screen. The OSD header assigns a particular address of the color look-up table to the area for the blending and gives a blending ratio at the area.

An OSD memory control method in a digital video display unit is further characterized by supporting color resources of different degrees of resolution in the same picture screen; and fulfilling lack of data with respect to data for accessing color resources of relatively lower resolution to realize access to color resources of relatively higher resolution. The fulfilling of the lack in the data for the access to the color resources of the relatively lower resolution is achieved such that an OSD local header supplies upper bits and a color look-up table is accessed with the extended data including the supplied upper bits, and individual OSD regions may have different color ranges.

BRIEF DESCRIPTION OF THE ATTACHED DRAWINGS

The invention will be described in detail with reference to the following drawings in which like reference numerals refer to like elements wherein:

FIG. 2b shows a memory structure when multiple OSD regions are displayed as in FIG. 2a;

FIG. 8 shows an embodiment of a global header according to the present invention;

DETAILED DESCRIPTION OF PREFERRED EMBODIMENT

Reference will now be made in detail to the preferred embodiments of the present invention, examples of which are illustrated in the accompanying drawings.

Figure 1:
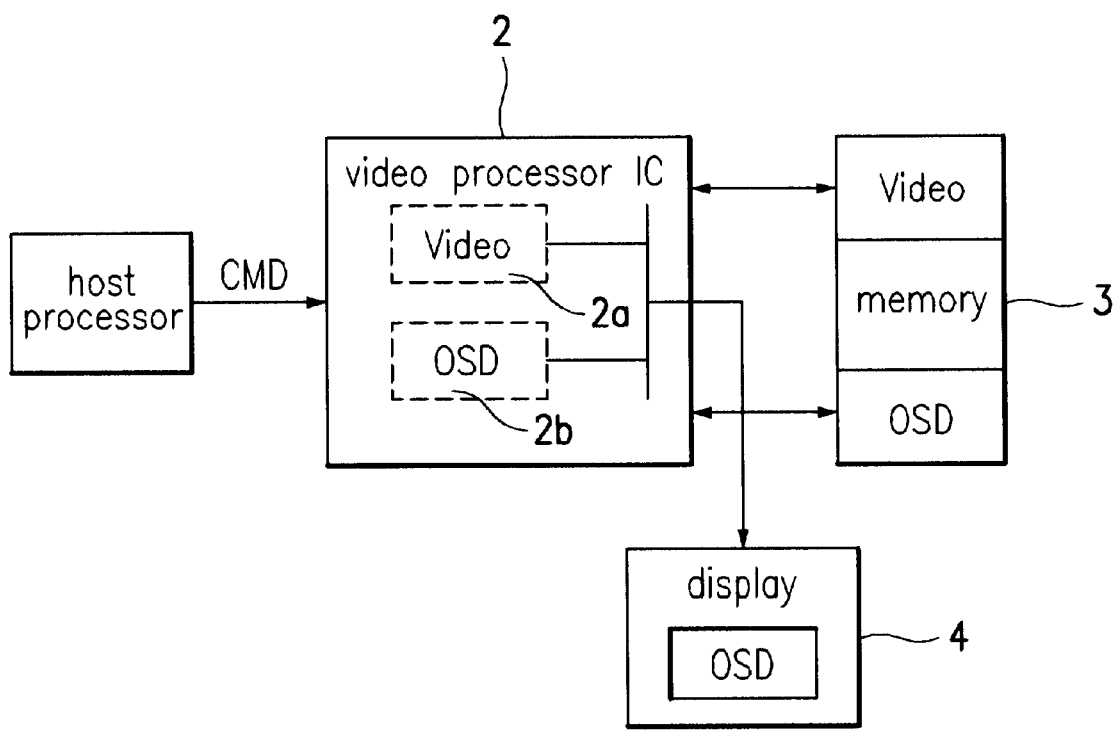
FIG. 1 is a block diagram showing a configuration of a conventional OSD operational function.
Figure 2A:
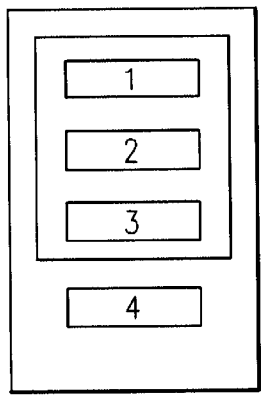
FIG. 2a shows multiple OSD regions displayed on a screen.
Figure 2B:
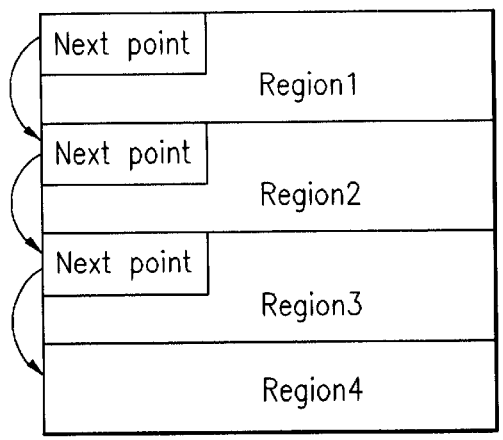
Figure 3:
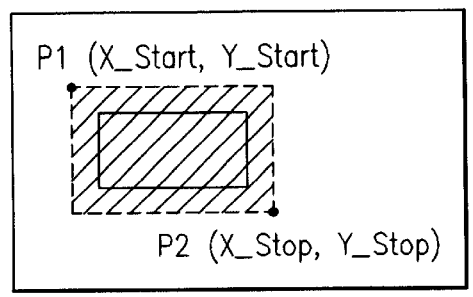
FIG. 3 shows a window based highlighting processing method.
Figure 4:
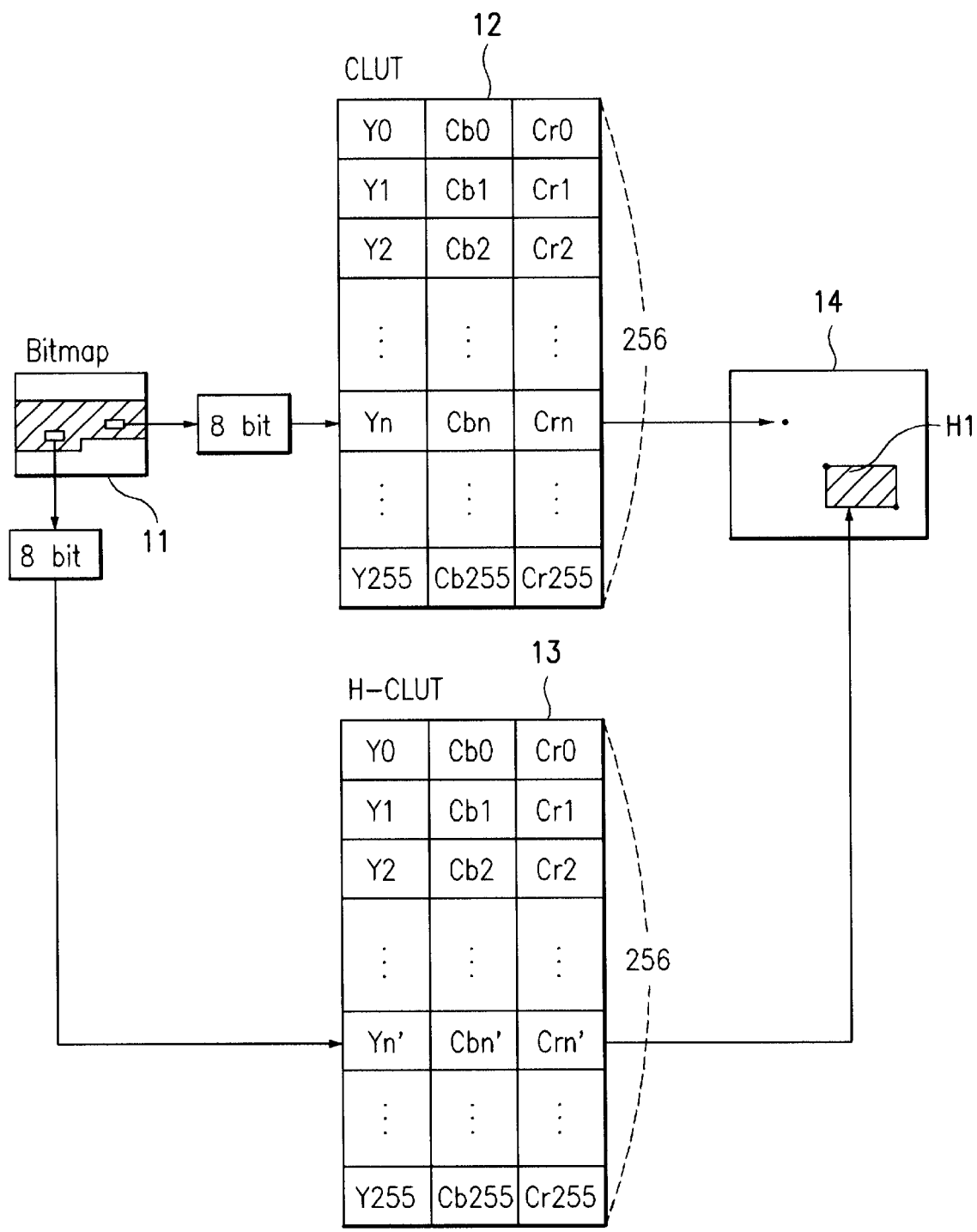
FIG. 4 shows a color access for highlight processing on an OSD.
Figure 5:
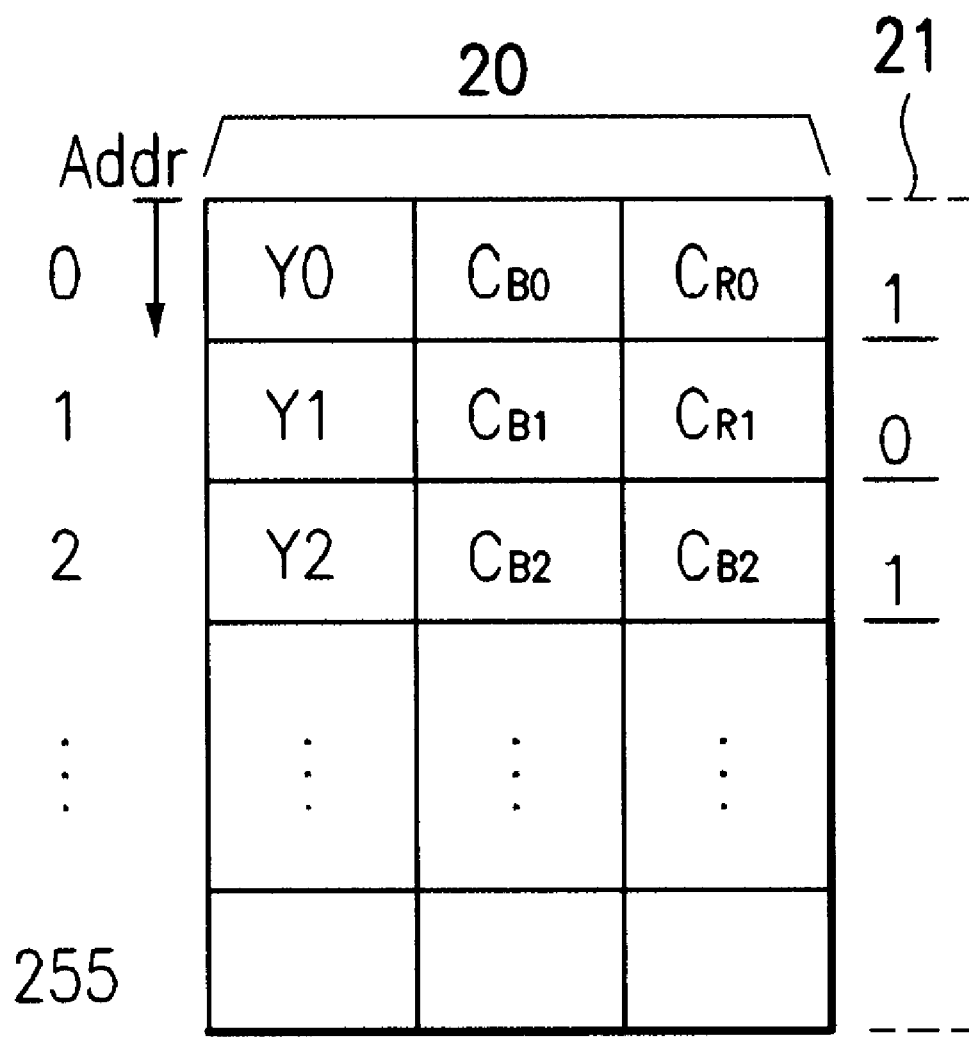
FIG. 5 shows a structure of a color look-up table for OSD blending.
Figure 6A:
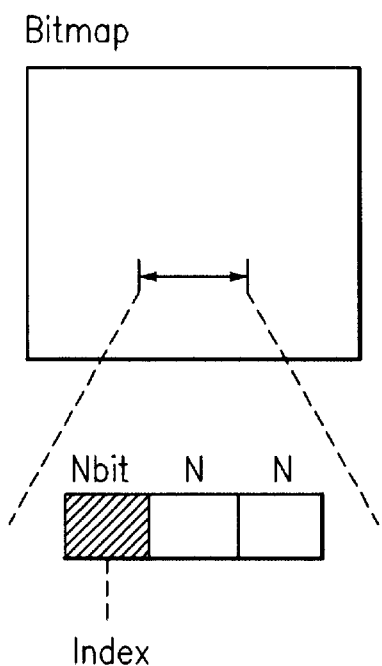
FIG. 6a shows data at a certain position in a bitmap area of an OSD memory.
Figure 6B:
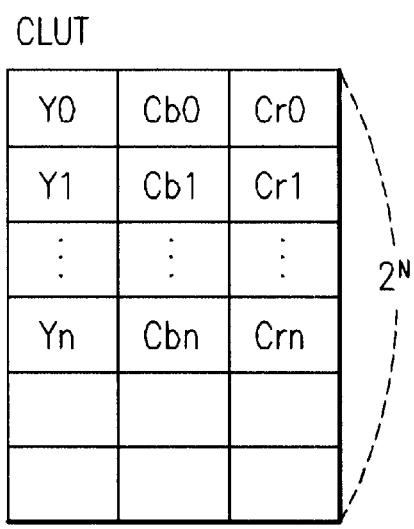
FIG. 6b shows a color look-up table.

Referring back to FIG. 1, the memory 3 stores the video information and the OSD information. According to the present invention, the area storing the OSD information is divided into a command area and a bitmap area. For example, data at a certain position can be represented by N-bits in the bitmap area, as shown in FIG. 6a. An index within the N bits is used as an address to a color look-up table (CLUT) stored in the command area, as shown in FIG. 6b. Namely, the OSD controller 2b visually presents the OSD information on the display device 4 based upon the color look-up table shown in FIG. 6b. An encoder (not shown) disposed between the video processor IC 2 and the display device 4 converts luminance signals Y and chrominance signals Cb and Cr, output from the color look-up table, into R G B analog color signals to present the OSD information.

Figure 7:
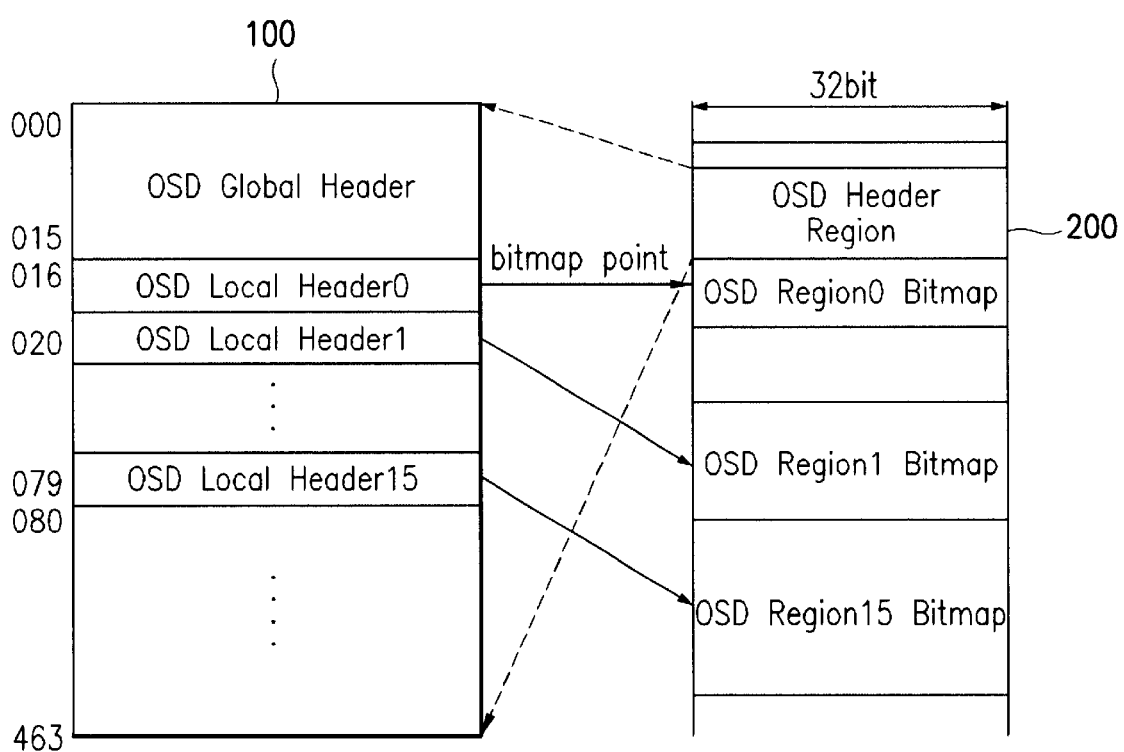
FIG. 7 shows an embodiment of an OSD memory structure in a digital video display unit according to the present invention.

Particularly, FIG. 7 shows an OSD memory structure in a digital video display unit according to the present invention comprising a command area 100 including an OSD global header controlling information of multiple OSD regions displayed on a screen and OSD local headers 0~15 containing characteristic information of the OSD information; and a bitmap area 200 including OSD regions 0~15 storing color signal data for implementation of OSD regions to be displayed on the screen. Each of the OSD local headers 0~15 in the command area 100 contains a data bitmap position (points) of each of the OSD regions 0~15.

Thus, in the OSD memory structure according to the present invention, the command area 100 storing control command data for implementing the OSD is separated from the bitmap area 200 storing the color signals for implementing the OSD, thereby optimizing the memory area, i.e. command area, which has a greater error possibility. Also, the command area 100 may be further divided into global header information and local header information. The position information of the OSD regions 0~15 stored in the bitmap area 200 is contained in the local header information.

Figure 9:
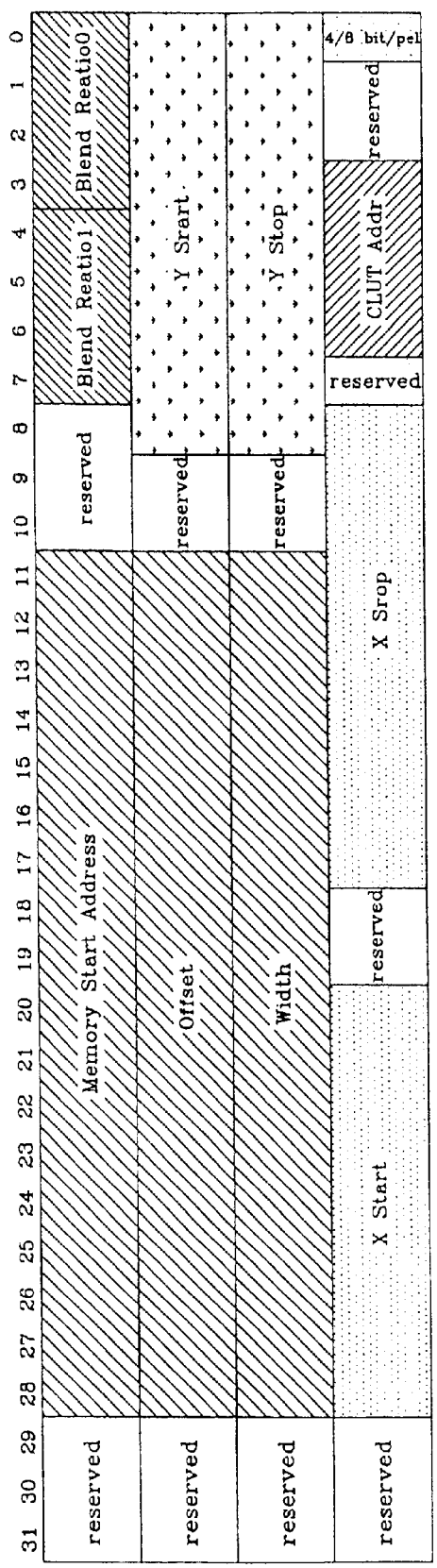
FIG. 9 shows an embodiment of a local header according to the present invention.

FIG. 8 shows a global header including the OSD information (OSD Info) to be visually presented, the background information (BackGR Info), the cursor information (Cursor Info) required when selecting a menu, and the highlight information (Hi-light Info) for changing a color of all or a part of a region to emphasize a certain part of the display screen. FIG. 9 shows a local header including an OSD size (offset and width), an OSD position (X Start, X Stop, Y Start, and Y Stop), a color look-up table address (CLUT Addr), and a blend ratio between original video data and OSD color data to implement the transparent effect on the OSD background against the original video.

Figure 10:
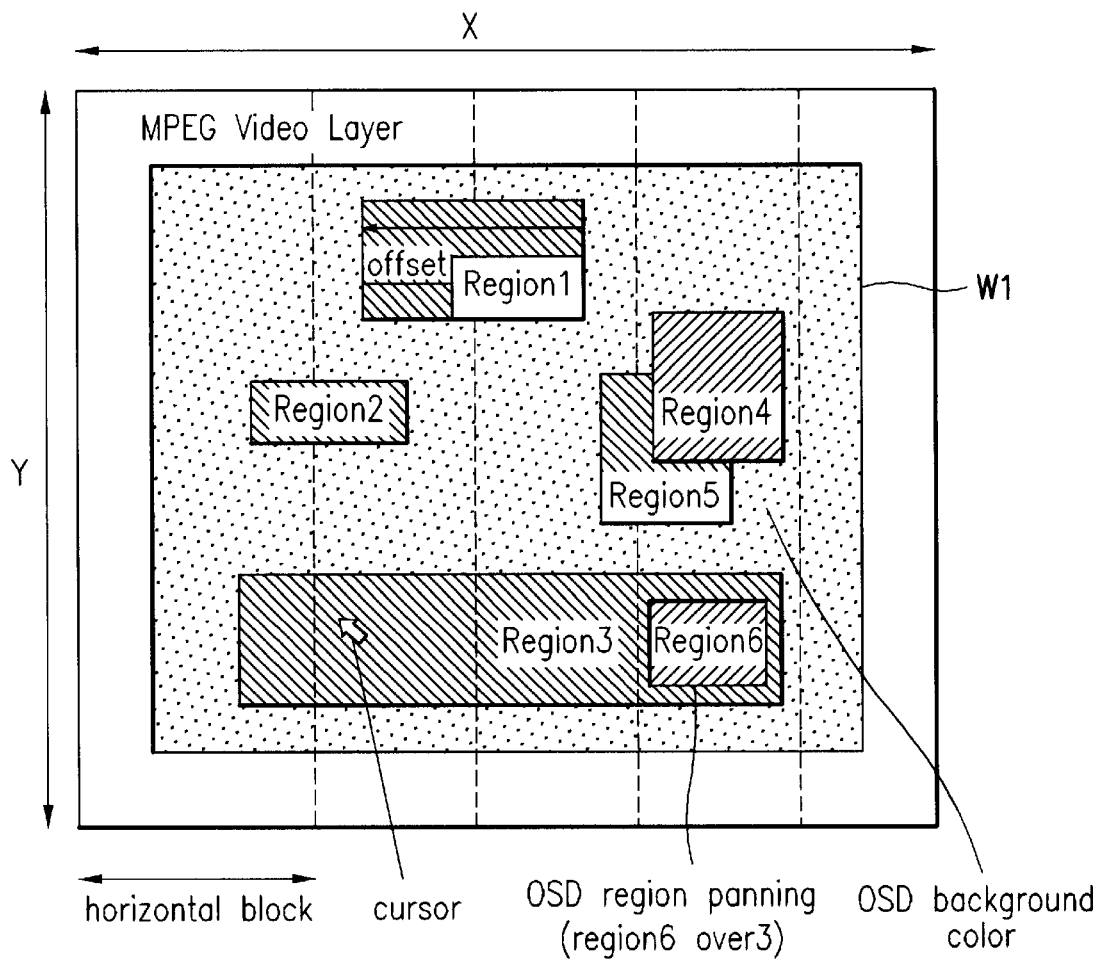
FIG. 10 shows an embodiment of multistandard OSD according to the present invention.
Figure 11:
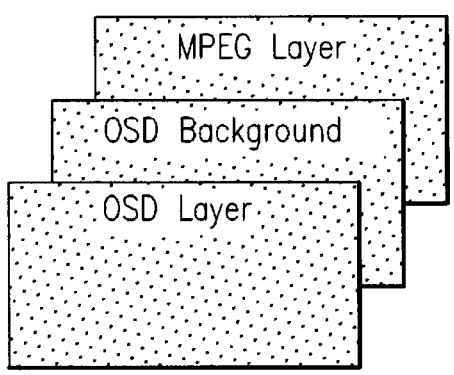
FIG. 11 illustrates a relationship between an OSD and an OSD background against an original video according to the present invention.

Particularly, the background information on the global header is not utilized for implementing a transparent effect on the OSD region against an original image being displayed. Instead, the background information is utilized for displaying colors between regions when the OSD regions are enclosed in a single window WI, as shown in FIG. 10, while displaying multiple OSD regions on the same picture screen. The color of the OSD background, shown in FIG. 11, is disposed prior to an MPEG video layer displayed on the screen and behind an OSD layer when expressing colors on the screen. Furthermore, the cursor, shown in FIG. 10, has a fixed shape but changes its position. Because the shape of the cursor is predetermined, only an address of the position would be changed. Thus, the cursor information is designed to be contained in the global header information.

Also, a flag to decide highlighting is established in the global header information and a corresponding OSD region is found based upon the position information of the OSD regions contained in the local header information according to the established flag, thereby performing a region based highlighting process. Particularly, during the region based highlighting process, the flag for deciding whether or not to highlight is incorporated into the header information of each OSD region. Such flag is set as an execution information of the highlighting process according to a request of a user or the necessity of a program.

Thereafter, the corresponding OSD region is highlighted according to the highlight header information, namely a value of a highlight enable flag. For example, if the value of the highlight enable flag is "1", the corresponding OSD region is highlighted and if the flag value is "0", the highlighting is not carried out.

Figure 12A:
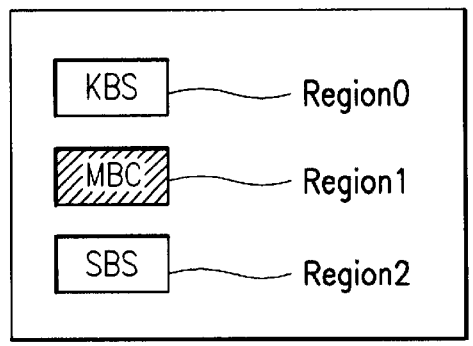
FIG. 12a illustrates an embodiment for a region based highlight process according to the present invention.
Figure 12B:
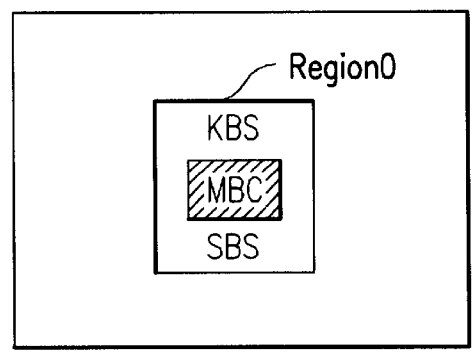
FIG. 12b illustrates an embodiment for a window based highlight process according to the present invention.

FIG. 12a shows a region based highlighting process when three OSD regions are simultaneously displayed on the same picture screen. The OSD regions 0 and 2 are not subject to the highlight while the OSD region 1 is highlighted according to the flag that is set to "1". FIG. 12b shows a window based highlighting process with respect to a text within the OSD region 1 when only one OSD region is displayed on the screen. A certain portion or text, MBC, within the OSD region cannot be highlighted when using the region based highlighting process. Accordingly, to highlight a text within a region, window points must be set to carry out the window based highlighting process.

Figure 12C:
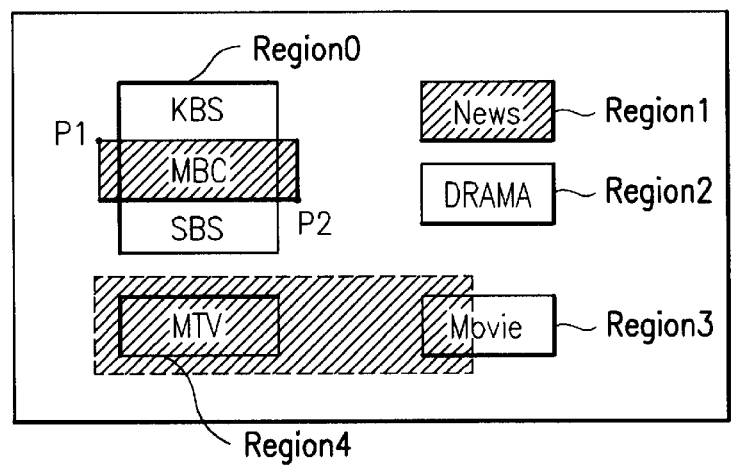
FIG. 12c illustrates an embodiment for a combination of the region based highlight process and the window based highlight process according to the present invention.

FIG. 12c shows examples of highlighting both a whole OSD region and a part of an OSD region, and highlighting a gap between OSD regions with respect to multiple OSD regions. In the OSD region 0 of FIG. 12c, only the text MBC is highlighted according to the window based highlighting process utilizing window points P1 and P2. The whole OSD region 1 is highlighted according to the region based highlighting process. For OSD regions 3 and 4, a gap between the regions is highlighted according to the window based highlighting process.

As discussed above, the flag is established on the header defining each OSD region and the highlighting is carried out based upon the flag. Thus, the load on the hardware is considerably reduced even if multiple highlighting processes are carried out as compared to the window based highlighting process. However, once the flag is positively set for the highlighting, a partial highlight within a region is difficult. Therefore, highlighting words of a song displayed on a monitor used in a karaoke, for example, would not be possible. In such case, the window based highlighting process, which allows certain parts of the region to be highlighted, must be utilized. Thus, the present invention uses the window based highlighting process when highlighting a part of an OSD region and when highlighting at least two different OSD regions together.

Figure 13:
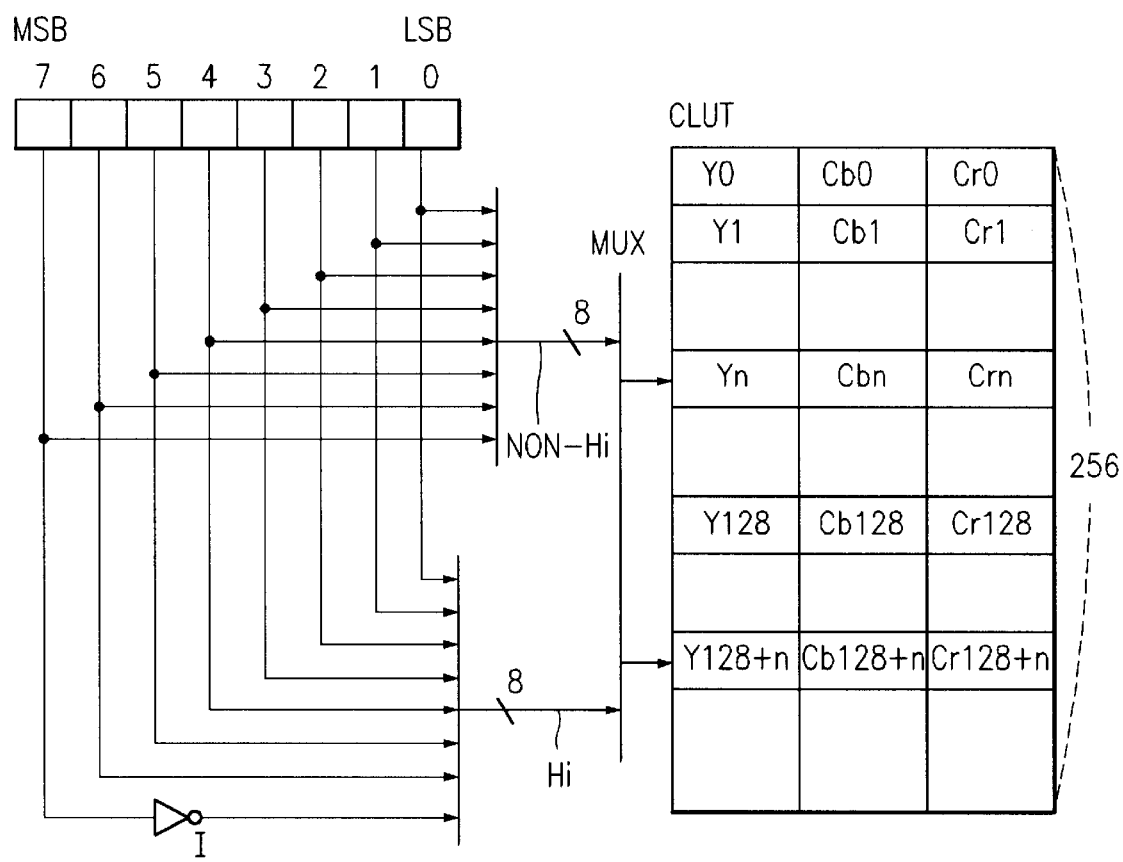
FIG. 13 illustrates an embodiment of a color access for highlight process on an OSD according to the present invention.

FIG. 13 shows a highlighting operation according to the present invention when a processing bit of data obtained from the bitmap region is 8 bits. A multiplexer MUX receives highlight data Hi, obtained by toggling data of the most significant bit (MSB) among the data from the bitmap region using an inverter I, via one input and receives the data NON-Hi, obtained directly from the bitmap region via another input. The multiplexer then receives highlight information from the command area in the OSD memory and outputs one of the highlight data Hi and the non-highlight data NON-Hi, according to the highlight information indicating whether or not to highlight a corresponding part.

Subsequently, color signal data in the color look-up table is accessed using an index of the data output from the multiplexer as an address. For the part to be highlighted, the most significant bit of the data obtained from the corresponding position in the bitmap region is inverted to access color signal data, $Y_{128+n}$, $Cb_{128+n}$, and $Cr_{128+n}$, different from the color signal data, Yn, Cbn, and Cm, supposed to be originally obtained from the color look-up table.

Figures 14, 15:
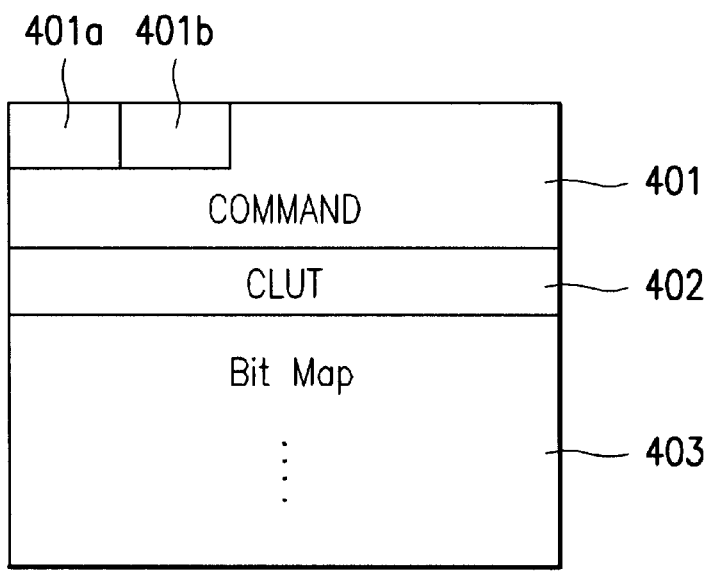
FIG. 14 illustrates an embodiment of an OSD blending method according to the present invention.
FIG. 15 illustrates an embodiment of an OSD header structure according to the present invention.

FIG. 14 shows a color look-up table for an 8-bit 256 color resources per pixel. The row 300 corresponding to the address "0" on the CLUT is assigned to a background color data region for blending and rows 301 corresponding to addresses 1~255 are assigned to the remaining color data region, i.e. the foreground. In the present invention, the two areas 300 and 301 are defined according to the position (address) in the color look-up table, and the OSD local header assigns 4-bit blending ratio to each area.

As shown in FIG. 15, the OSD information is divided into the OSD command area 401, the CLUT 402, and the bitmap area 403. Within the OSD command area 401, a blending ratio to be applied to the color signal corresponding to the address "0" in the color look-up table is stored in area 401a. The blending ratio to be commonly applied to the signals corresponding to the remaining color look-up table addresses is stored in area 401b.

Particularly, if a value of the OSD bitmap is "0", color signals corresponding to the color look-up table address "0" are read and the blending ratio for the color signals (color data) is determined according to a value assigned to area 401a. If the value of the OSD bitmap has values 1~255, other than "0", color signals corresponding to the color look-up table addresses are obtained as OSD signals and the blending ratio of these color signals is determined by a value assigned to area 401b of the command area 401.

Referring back to FIG. 1, assume an 8-bit color is used for a pixel on the OSD data displayed on the display 4 via an encoder (not shown). In response to a command CMD from the host processor 1, the video processor IC 2 carries out the OSD process referring to the OSD data in memory 3. According to the present invention, during the OSD process, one address "0" in the color look-up table becomes the color data 300 for blending of a background image while the remaining address "1"~"255" becomes the color data 301 presented as the OSD.

The address assigned as a background color signal may be set in different ways depending upon the particular embodiment.

Particularly, two independent areas are discriminated according to the position (address) in the color look-up table to carry out the blending process. The blending address and the blending ratio are given by the OSD local header, thereby carrying out the desired blending process on the multiple OSD regions without limitations.

Figure 16:
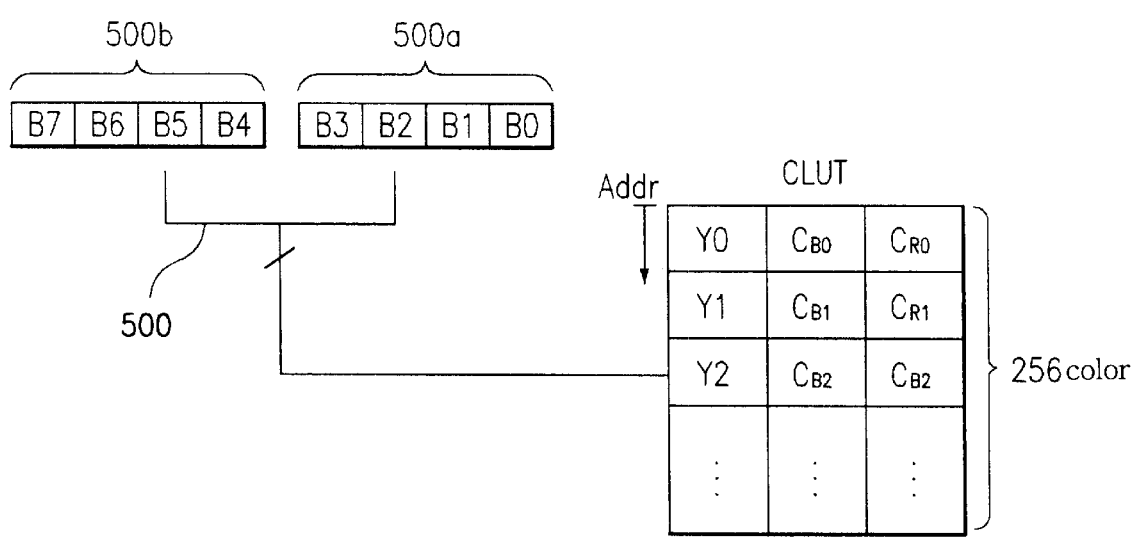
FIG. 16 illustrates an embodiment of a color data access method according to the present invention.

FIG. 16 shows a highlighting operation according to the present invention where 4 upper bits are supplied from the OSD local header to access the 8-bit 256 color resources at the low resolution of 4-bits. If the color look-up table is accessed using 4-bit data as an address index to the color look-up table, generally 16 color resources can be accessed among the 256 color resources. According to the present invention, the upper 4-bit index data 500b is supplied from the OSD local header, allowing access to the color look-up table with 8-bit index data 500.

Referring back to FIG. 1, assume a 4-bit color is used for a pixel on the OSD data displayed on the display 4 via an encoder (no shown). In response to a command CMD from the host processor 1, the video processor IC 2 carries out the OSD process referring to the OSD data in memory 3. According to the present invention, rather than supporting merely 16 colors using the 4 bits, 256 colors are supported using the 8 bit construction by adding the upper 4 bits from the OSD header to the original 4 bits.

The above described function is very useful when carrying out a highlighting function with respect to multiple OSD regions. Namely, because the highlighting function is to discriminate a certain OSD region from other parts by changing its color without changing the content of OSD information, the color change required for the highlight can be satisfied with simply 16 colors. Thus, the 4-bit 16 colors can be supported using the 4-bit index when accessing the color look-up table. For cases other than the highlighting process, the upper 4 bits are supplied from the OSD header, thereby supporting the 8-bit 256 color resources.

As illustrated above, the OSD memory structure in the digital video display unit and the method therefor according to the present invention designs the OSD memory structure in such a manner of dividing the command area from the bitmap area, thereby minimizing OSD errors even if the host processor over-writes data while outputting bitmap. The present invention also provides the global header information containing information on a plurality of OSD regions displayed on the same picture screen and the local header information containing characteristic information of the OSD regions, thereby reducing memory requirement during the step of analyzing the OSD information on the multiple OSD regions and allowing an effective process on the OSD.

The present invention effectively and selectively employs the OSD region based highlighting process and the window based highlighting process depending upon what is to be highlighted on the screen, thereby carrying out the highlighting process on multistandard OSD without adding an extra load on the hardware. Furthermore, the present invention inverts established bits of data to be highlighted to access color signal data different from original color signal data during the highlight process, thereby simply carrying out the highlight process without adding an extra load on the hardware. Particularly, the present invention inverts the most significant bit, thereby efficiently utilizing the color look-up table.

Moreover, the present invention also discriminates two independent areas according to the position (address) in the color look-up table to carry out the blending process and allows the OSD local header to assign a blending ratio to each region. Therefore, compared with the conventional case of adding 1 bit blending flag data, the present invention allows respective OSD regions to have different blending values to freely express colors without limitations while using the same color look-up table without reconstructing the data of the color look-up table.

Finally, the present invention allows access to an extended n-bit color look-up table even when using m-bit colors of the lower resolution under the condition of supporting different degrees of resolution on the same picture screen, thereby fully utilizing the color resources. For example, even if a system supports both 4-bit resolution and 8-bit resolution on the same picture screen, only 16 colors were supported in case of 4 bits in the conventional art. According to the present invention, however, 4 additional bits are supplied from the OSD header, thereby allowing an extended access of the 8-bit 256 color resources. The processing operation can also be uniformly carried out in units of 8-bit, thereby simplifying the hardware structure.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A memory structure for an OSD, the memory structure comprising:
    a command area including a global header to control all OSD information displayable on a display screen and a plurality of local headers storing characteristic information of the OSD information; and
    a bitmap area designated separate from the command area and storing color signal data to display the OSD information.

2. A memory structure of claim 1, wherein each local header contains information for designating positions of OSD regions stored in the bitmap area.

3. A memory structure of claim 1, wherein the global header contains the OSD information, a background information, a cursor information, and a highlight information.

4. A memory structure of claim 1, wherein at least one of the local headers contains an OSD size, an OSD position, a color look-up table address, and a blend ratio between an original video data and the OSD data.

5. A memory structure of claim 1, wherein a plurality of OSD regions are displayed on said display screen.

6. A memory structure of claim 1, wherein at least one of the global headers contains the OSD information, a background information and a highlight information; and wherein at least one of the local headers contains an OSD size, an OSD position, a color look-up table address, and a blend ratio between an original video data and OSD data.

7. A memory structure of claim 6, wherein a flag indicating whether to highlight is established in the global header information for each OSD region, and an OSD region corresponding to the established flag region is found based upon the OSD position information contained in the corresponding local header to perform a region based highlighting.

8. A memory structure of claim 1, wherein the bitmap area stores the color signal data in a color look-up table (CLUT) by dividing the CLUT into a plurality of independent areas and wherein blending color values are assigned to color values in the divided areas for a blending process.

9. A memory control method for an OSD process, the method comprising:
    (a) storing, in a first memory area, global header data to control all OSD information displayable on a display screen and local header data containing characteristic information of the OSD information; and
    (b) storing, in a second memory area designated separate from the first memory area, color signal data to display the OSD information.

10. A method of claim 9, wherein the step (a) further comprises:
    dividing the first memory area into a global header area and a local header area; and
    storing the global header data in the global header area and storing the local header data in the local header area, wherein each local header data contains information for designating positions of OSD regions stored in the second memory area.

11. A method of claim 9, further comprising the step of displaying a plurality of OSD regions on said display screen utilizing the first memory area and the second memory area.

12. A method of claim 9, wherein the global header contains the OSD information, a background information and a highlight information; and wherein the local header contains an OSD size, an OSD position, a color look-up table address, and a blend ratio between an original video data and OSD data.

13. A method of claim 9, further comprising:
    establishing a highlight enable flag indicating whether to highlight a region in the global header for each OSD region;
    setting a flag value according to a request for highlighting; and
    highlighting an OSD region corresponding to the set flag value based upon the OSD position information contained in the local header.

14. A method of claim 13, further comprising:
    highlighting either a portion of an OSD region or a gap between OSD regions by a window based highlighting process based upon the OSD position information contained in the local header.

15. A method of claim 9, further comprising:
    storing color signal data in a color look-up table (CLUT);
    determining whether or not to highlight a portion of an OSD region; and
    inverting bits of bitmap data corresponding to the OSD portion to be highlighted, and accessing the color signal data of the CLUT by utilizing the inverted bits.

16. A method of claim 15, wherein the step of inverting comprises assigning the bits of the bitmap data as a most significant bit and inverting only the most significant bit.

17. A method of claim 9, wherein the step (b) comprises:
    storing color signal data in a color look-up table (CLUT) by dividing the CLUT into a plurality of independent areas; and
    assigning blending color values to color values in the divided areas for a blending process.

18. A method of claim 17, wherein the assigning step comprises:
    designating particular addresses of the CLUT as an area for the blending process; and
    assigning a blending ratio to each area corresponding to the designated addresses, wherein said blending ratio may be different values for each area.

19. A method of claim 9, further comprising:
    extending data by adding upper bits from the local header to original bits and accessing a color look-up table (CLUT) with the extended data to support color resources of different degrees of resolution in the same picture screen.

20. A method of claim 19, wherein the extending step is performed to access color resources of higher resolution.

21. A memory structure in a digital video display unit, the memory structure comprising:

a first memory area storing video information; and a second memory area storing OSD information, wherein the second memory is divided into a command area storing global header data to control all OSD information displayable on a display screen and local header data containing characteristic information of the OSD information, and a bitmap area designated separate from the first command area and storing color signal data to display the OSD information.

22. A memory control method for an OSD process, the method comprising:
  (a) storing global header data to control OSD information displayed on a display screen and local header data containing characteristic information of the OSD information in a first memory area;
  (b) storing color signal data to display the OSD information in a second memory area;
  (c) storing color signal data in a color look-up table (CLUT);
  (d) determining whether or not to highlight a portion of an OSD region; and
  (e) inverting bits of bitmap data corresponding to the OSD portion to be highlighted, and accessing the color signal data of the CLUT utilizing the inverted bits.

23. A memory control method for an OSD process, the method comprising:
  (a) storing global header data to control OSD information displayed on a display screen and local header data containing characteristic information of the OSD information in a first memory area;
  (b) storing color signal data to display the OSD information in a second memory area; and
  (c) extending data by adding upper bits from the local header to original bits and accessing a color look-up table with the extended data to support color resources of different degrees of resolution in the same picture screen.

* * * * *